United States Patent
Veal et al.

(10) Patent No.: US 10,635,598 B2
(45) Date of Patent: Apr. 28, 2020

(54) MEMORY-ADDRESSED MAPS FOR PERSISTENT STORAGE DEVICE

(71) Applicant: Intel Corporation, Santa Clara, CA (US)

(72) Inventors: Bryan Veal, Beaverton, OR (US); Annie Foong, Aloha, OR (US)

(73) Assignee: Intel Corporation, Santa Clara, CA (US)

(*) Notice: Subject to any disclaimer, the term of this patent is extended or adjusted under 35 U.S.C. 154(b) by 27 days.

(21) Appl. No.: 15/941,868

(22) Filed: Mar. 30, 2018

(65) Prior Publication Data

US 2019/0050341 A1 Feb. 14, 2019

(51) Int. Cl.
*G06F 12/10* (2016.01)
*G06F 13/16* (2006.01)
*G06F 12/02* (2006.01)

(52) U.S. Cl.
CPC .......... *G06F 12/10* (2013.01); *G06F 13/1642* (2013.01); *G06F 2212/1016* (2013.01); *G06F 2212/202* (2013.01); *G06F 2212/657* (2013.01)

(58) Field of Classification Search
CPC ...... G06F 3/065; G06F 3/0608; G06F 3/0688; G06F 12/0897
See application file for complete search history.

(56) References Cited

U.S. PATENT DOCUMENTS

| | | | | |
|---|---|---|---|---|
| 2009/0083515 | A1* | 3/2009 | Mitra | G06F 15/7867 712/28 |
| 2010/0153676 | A1* | 6/2010 | Kawamura | H03K 19/17728 711/170 |
| 2015/0169230 | A1* | 6/2015 | Asnaashari | G06F 3/0688 711/103 |
| 2017/0351639 | A1* | 12/2017 | Borikar | G06F 15/17331 |
| 2018/0052606 | A1* | 2/2018 | Frey | G06F 13/1689 |

OTHER PUBLICATIONS

Stephen Bates, "Project Donard: Peer-to-peer Communication with NVM Express Devices, Part 1", Sep. 23, 2014, retrieved from blog.pmcs.com/project-donard-peer-to-peer-communication-with-nvm-express-devices-part-1/, 6 pages.
Stephen Bates, "Project Donard: Peer-to-peer Communication with NVM Express Devices, Part Two", Dec. 12, 2014, retrieved from blog.pmcs.com/project-donard-peer-to-peer-communication-with-nvm-express-devices-part-two/, 7 pages.
(Continued)

*Primary Examiner* — Getente A Yimer
(74) *Attorney, Agent, or Firm* — Jordan IP Law, LLC

(57) ABSTRACT

An embodiment of a semiconductor apparatus may include technology to determine one or more logical block addresses for a persistent storage media, determine one or more addresses for a physical memory space, and define a memory-mapped input/output region for the physical memory space with a direct mapping between the one or more addresses for the physical memory space and the one or more logical block addresses for the persistent storage media. Other embodiments are disclosed and claimed.

25 Claims, 8 Drawing Sheets

(56) References Cited

OTHER PUBLICATIONS

Stephen Bates, "Donard: NVM Express for Peer-2-Peer between SSDs and other PCIe Devices", SNIA Storage Developer Conference, 2015, retrieved from snia.org/sites/default/files/SDC15_presentations/nvme_fab/StephenBates_Donard_NVM_Express_Peer-2_Peer, 18 pages.

Davis et al., "NVMe over Fabrics—High Performance Flash Moves to Ethernet", SNIA Storage Developer Conference, 2016, retrieved from snia.org/sites/default/files/SDC/2016/presentations/nvme_over_fabrics/Davis_Burste_in_NVMe_over_Fabrics, 34 pages.

QLogic, "NVMe Direct", Apr. 2017, retrieved from qlogic.com/Resources/Documents/WhitePapers/Adapters/WP_NVMeDirect, 5 pages.

Landsman et al., "NVMe Annual Update, NVMe 1.3 and NVMe Market Data Session A11 Part A", Flash Memory Summit, 2017, retrieved from nvmexpress.org/wp-content/uploads/A11-Part-A-Roadmap-and-1.3-and-Market-v1.2-1, 40 pages.

* cited by examiner

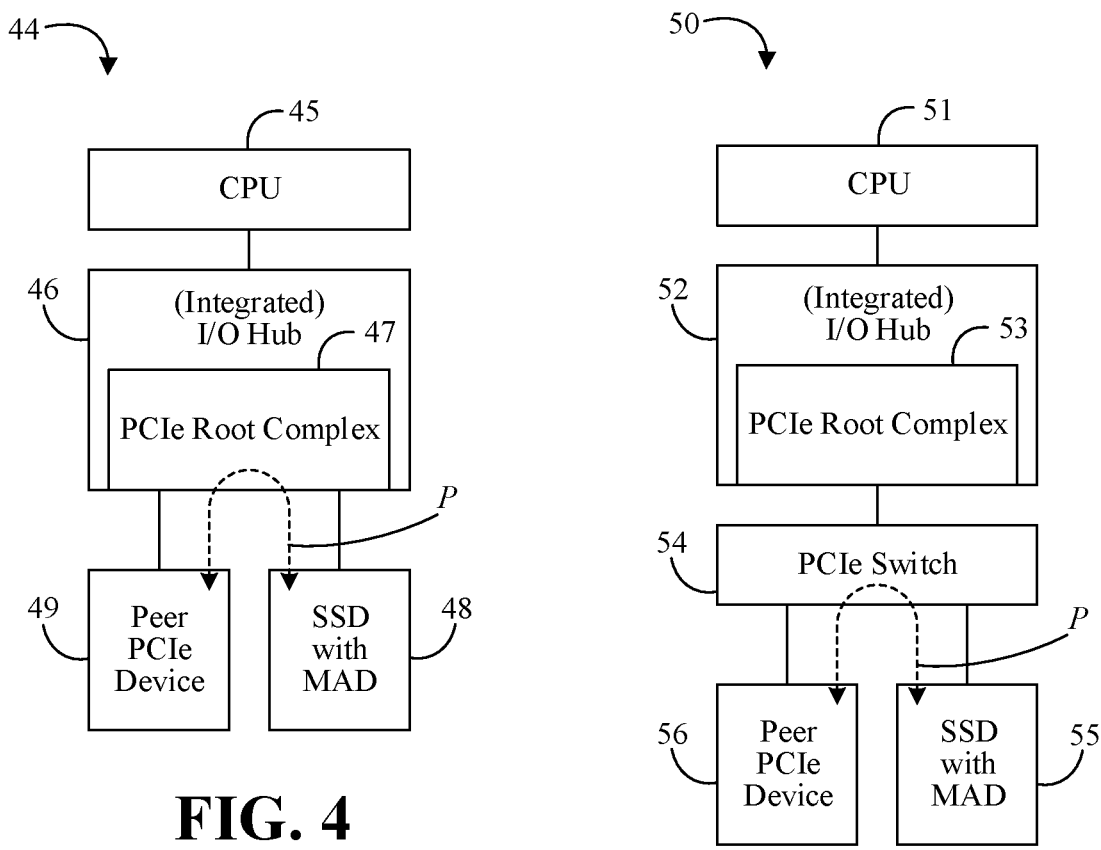
FIG. 4
FIG. 5
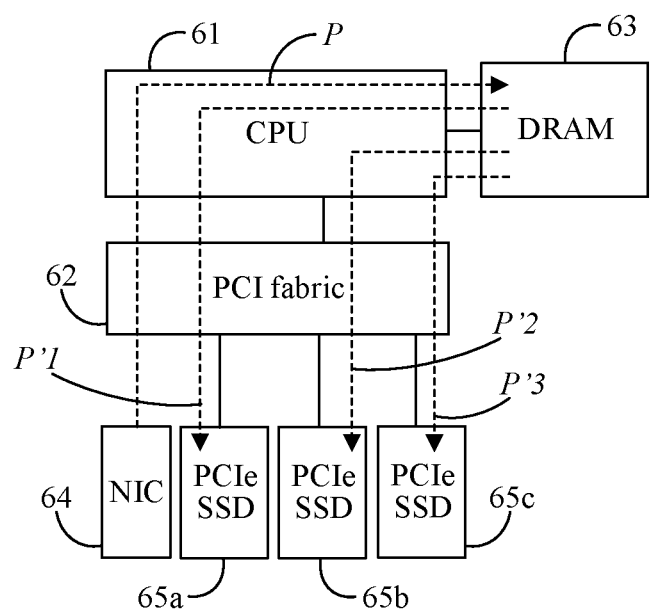
FIG. 6

|  | 31 | 30 29 28 | 27 26 25 24 | 23 | 22 21 | 20 19 18 17 | 16 | 15 | 14 | 13 12 | 11 10 9 8 | 7 6 5 4 3 2 | 1 0 |
|---|---|---|---|---|---|---|---|---|---|---|---|---|---|
| DW 0 | R 0 | Fmt 0x2 | Type 0x00 | R 0 | TC 0 | R 0 | TD 0 | EP 0 | Attr 0 | R 0 | Length 0x001 | | |
| DW 1 | Requester ID 0x0000 | | | | | | | | | Tag (unused) 0x00 | Last BE 0x0 | 1st BE 0xf |
| DW 2 | Address [31:2] 0x3f6bfc10 | | | | | | | | | | | R 0 |
| DW 3 | Data DW 0 0x12345678 | | | | | | | | | | | |

MEMORY-ADDRESSED MAPS FOR PERSISTENT STORAGE DEVICE

TECHNICAL FIELD

Embodiments generally relate to storage systems. More particularly, embodiments relate to memory-addressed maps for a persistent storage device.

BACKGROUND

A solid-state drive (SSD) may include non-volatile memory (NVM) technology. Access to the contents of the SSD may be supported with a protocol such as NVM EXPRESS (NVMe), Revision 1.3, published May 2017 (nvmexpress.org).

BRIEF DESCRIPTION OF THE DRAWINGS

The various advantages of the embodiments will become apparent to one skilled in the art by reading the following specification and appended claims, and by referencing the following drawings, in which:

FIG. 4 is a block diagram of an example of another electronic processing system according to an embodiment;

FIG. 5 is a block diagram of an example of another electronic processing system according to an embodiment;

FIG. 6 is a block diagram of an example of another electronic processing system according to an embodiment;

FIG. 8 is an illustrative diagram of a memory access request packet according to an embodiment;

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation non-volatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
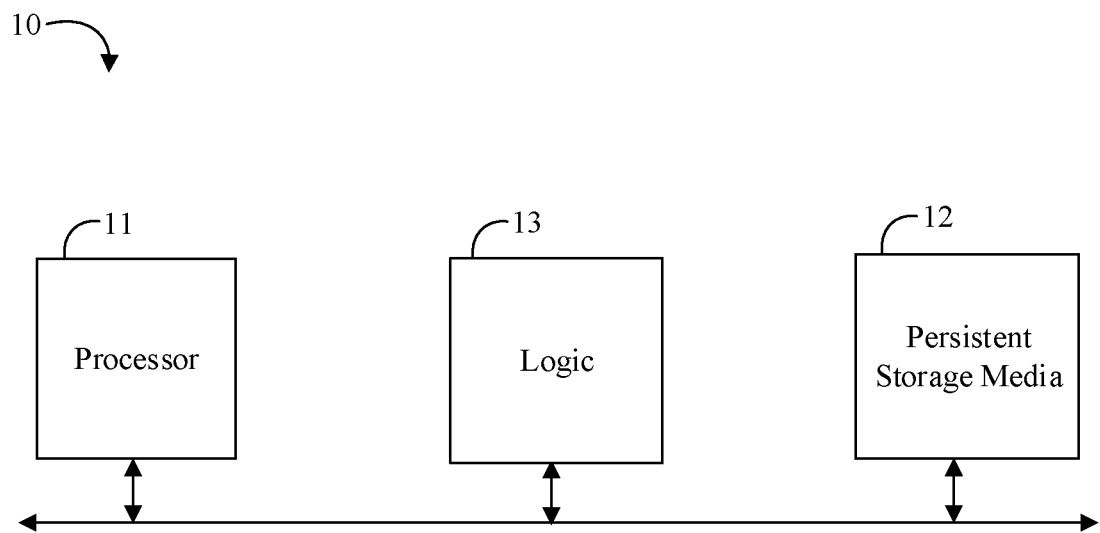
FIG. 1 is a block diagram of an example of an electronic processing system according to an embodiment.

Turning now to FIG. 1, an embodiment of an electronic processing system 10 may include a processor 11, persistent storage media 12 communicatively coupled to the processor 11, and logic 13 communicatively coupled to the persistent storage media 12 to determine one or more logical block addresses for the persistent storage media 12, determine one or more addresses for a physical memory space, and define a memory-mapped input/output region for the physical memory space with a direct mapping between the one or more addresses for the physical memory space and the one or more logical block addresses for the persistent storage media 12. For example, the logic 13 may be configured to provide a pre-determined granularity for the one or more logical block addresses. In some embodiments, the logic 13 may be further configured to provide access to the memory-mapped input/output region based on one or more of a processor load and a processor store instruction.

In some embodiments of the system 10, the logic 13 may also be configured to provide access to the memory-mapped input/output region based on a bus access request from a peer bus device. For example, the logic 13 may be configured to queue bus access requests for the memory-mapped input/output region, and interpret the bus access requests as input/output commands with associated addresses and lengths. In some embodiments, the logic 13 may be further configured to buffer a bus write request if the size of the bus write request is smaller than a size of a persistent storage media access. In some embodiments, the logic 13 may be configured to offset the one or more logical block addresses of the persistent storage media 12 based on an offset from a bus base address register. In any of the embodiments herein, the persistent storage media 12 may include a non-volatile memory (e.g., NAND-based memory, 3D crosspoint technology, etc.). In some embodiments, the logic 13 may be located in, or co-located with, various components, including the processor 11 (e.g., on a same die).

Embodiments of each of the above processor 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12, or other system memory may store a set of instructions which when executed by the processor 11 cause the system 10 to implement one or more components, features, or aspects of the system 10 (e.g., the logic 13, determining the logical block addresses for the persistent storage media, determining the addresses for the physical memory space, defining the MMIO region for the physical memory space with the direct mapping between the addresses for the physical memory space and the logical block addresses for the persistent storage media, etc.).

Figure 2:
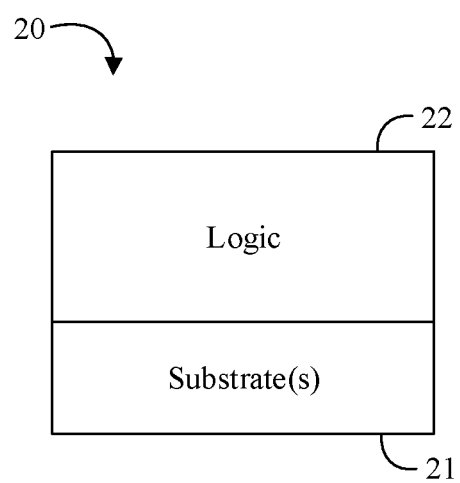
FIG. 2 is a block diagram of an example of a semiconductor package apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine one or more logical block addresses for a persistent storage media, determine one or more addresses for a physical memory space, and define a memory-mapped input/output region for the physical memory space with a direct mapping between the one or more addresses for the physical memory space and the one or more logical block addresses for the persistent storage media. For example, the logic 22 may be configured to provide a pre-determined granularity for the one or more logical block addresses. In some embodiments, the logic 22 may be further configured to provide access to the memory-mapped input/output region based on one or more of a processor load and a processor store instruction.

In some embodiments of the apparatus 20, the logic 22 may also be configured to provide access to the memory-mapped input/output region based on a bus access request from a peer bus device. For example, the logic 22 may be configured to queue bus access requests for the memory-mapped input/output region, and interpret the bus access requests as input/output commands with associated addresses and lengths. In some embodiments, the logic 22 may be further configured to buffer a bus write request if the size of the bus write request is smaller than a size of a persistent storage media access. In some embodiments, the logic 22 may be configured to offset the one or more logical block addresses of the persistent storage media based on an offset from a bus base address register. In any of the embodiments herein, the persistent storage media may include a non-volatile memory (e.g., NAND-based memory, 3D crosspoint technology, etc.). In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
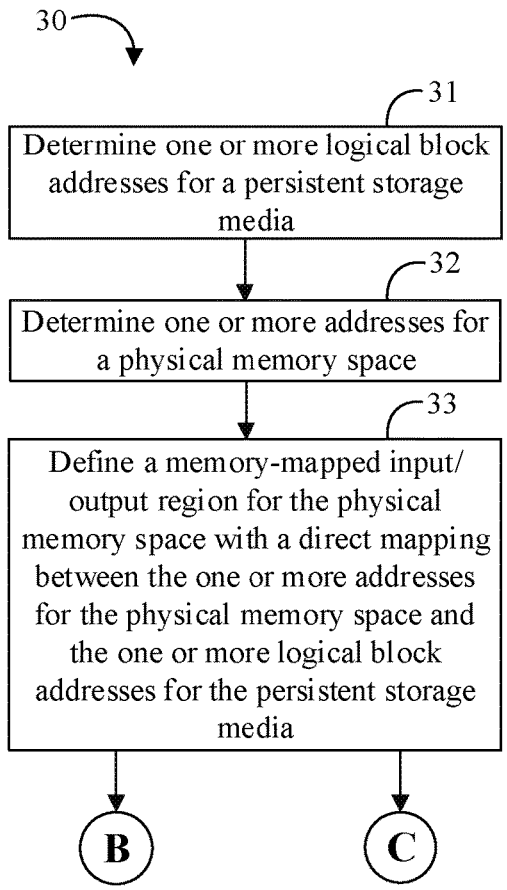
FIGS. 3A to 3C are flowcharts of an example of a method of mapping memory according to an embodiment.
Figure 3B:
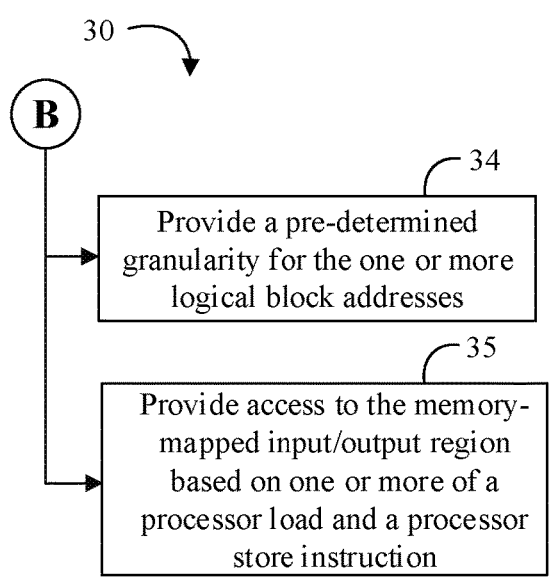
Figure 3C:
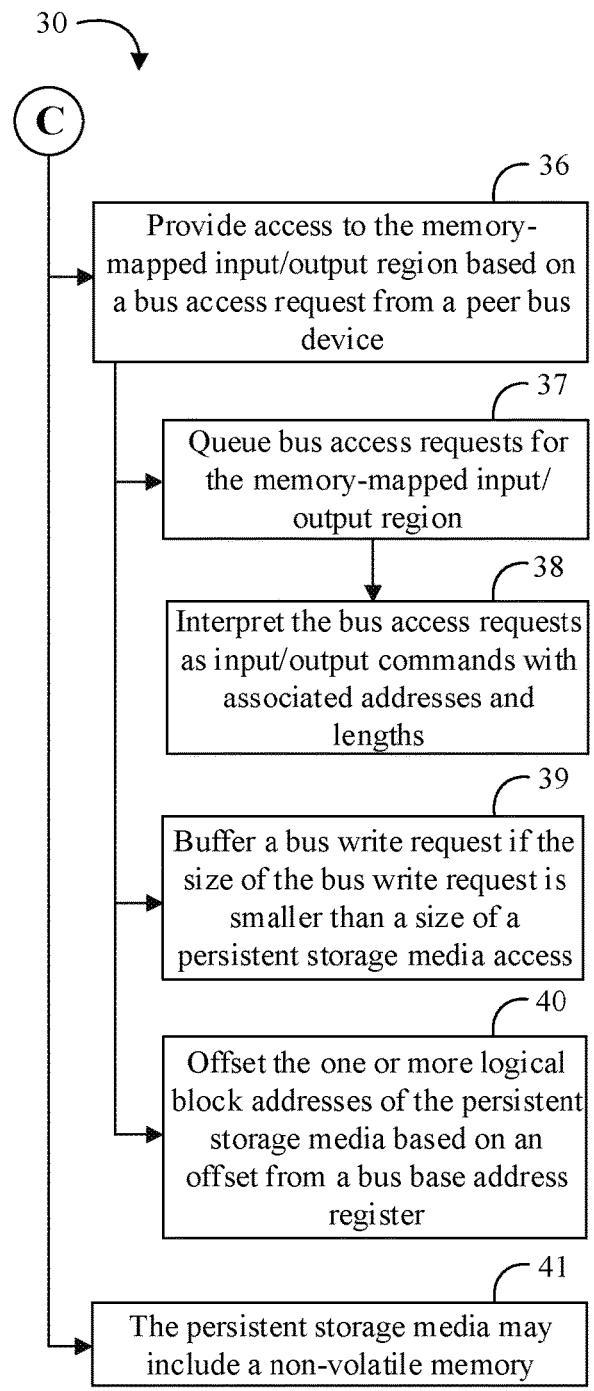

Turning now to FIGS. 3A to 3C, an embodiment of a method 30 of mapping memory may include determining one or more logical block addresses for a persistent storage media at block 31, determining one or more addresses for a physical memory space at block 32, and defining a memory-mapped input/output region for the physical memory space with a direct mapping between the one or more addresses for the physical memory space and the one or more logical block addresses for the persistent storage media at block 33. For example, the method 30 may also include providing a pre-determined granularity for the one or more logical block addresses at block 34. Some embodiments of the method 30 may further include providing access to the memory-mapped input/output region based on one or more of a processor load and a processor store instruction at block 35.

In some embodiments, the method 30 may further include providing access to the memory-mapped input/output region based on a bus access request from a peer bus device at block 36. For example, the method 30 may include queuing bus access requests for the memory-mapped input/output region at block 37, and interpreting the bus access requests as input/output commands with associated addresses and lengths at block 38. The method 30 may also include buffering a bus write request if the size of the bus write request is smaller than a size of a persistent storage media access at block 39, and/or offsetting the one or more logical block addresses of the persistent storage media based on an offset from a bus base address register at block 40. For example, the persistent storage media may include a non-volatile memory at block 41.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 26 to 33 below. Embodiments or portions of the method 30 may be implemented in firmware, applications (e.g., through an application programming interface (API)), or driver software running on an operating system (OS).

Some embodiments may advantageously provide a solid-state drive (SSD) with memory-addressed device (MAD) technology that may map memory space to non-volatile storage. Some embodiments of a SSD with the MAD included may provide a persistent memory-mapped region in the SSD's PERIPHERAL COMPONENT INTERCONNECT (PCI) EXPRESS (PCIe) memory space which may be capable of being accessed via central processor unit (CPU) load/store operations or via peer-to-peer access from other devices. For a remote direct memory access (RDMA) network interface controller (RNIC), for example, the MAD technology may allow remote systems to perform input/output (I/O) directly to the SSD. Some embodiments may be particularly advantageous for data replication, where peer-to-peer writes of data to the MAD may not interfere with the target host's CPU or memory. Embodiments of the MAD technology may also advantageously provide direct persistent storage access to peer accelerators, GPUs, FPGA devices, etc., which may not support block storage protocols such as NVMe.

In some embodiments, a memory-mapped I/O controller may support a generic memory address used to name memory and storage in a platform. In some embodiments, a PCIe device may support a persistent memory-mapped range, where memory addresses map 1:1 to non-volatile media (e.g., NAND or INTEL 3DXPOINT memory technology). Some embodiments may support direct use of the offset from a PCI base address register (BAR) as the offset address of media. Some embodiments may utilize the resulting I/O transport address (e.g., a PCIe address) as the mechanism for routing. Some embodiments may include logic that may expose a larger (e.g., GB, TB, etc.) memory space via a smaller (e.g., KB, MB, etc.) buffer by queueing PCIe packets and caching data.

Some embodiments may provide I/O buffering logic to mitigate interface to media differences between the device's PCIe memory interface and the block-address media interface. For example, the I/O buffering logic may include technology to coalesce small, sequential PCIe memory writes into larger media-block aligned writes; to perform read-modify-write to media blocks due to unaligned PCIe memory writes, and/or to perform read-ahead of multiple contiguous blocks to overcome media read latencies and maximize throughput for sequential PCIe memory read requests.

Some embodiments may include logic to identify the end of a transaction without requiring hardware changes in peer devices. For example, some embodiments may include memory fence technology that guarantees ordering and persistence of writes (e.g., via a flush to media) before acknowledging the special reads or writes, based on PCIe memory reads or writes to a specific address space. Some embodiments may additionally or alternatively include transaction management technology, where a completion queue entry of a peer device (e.g., a RNIC network controller) may be written to the SSD with MAD technology instead of host memory. The MAD technology may then guarantee ordering and persistence of writes, before forwarding the completion queue entry to the host.

In some embodiments, a SSD with MAD technology may provide a memory-mapped I/O (MMIO) region in PCIe memory space, where addresses may correspond 1:1 with media logical block addresses (LBAs), which may have a pre-agreed granularity. The MAD MMIO space may be accessed via load/store CPU instructions, or by a peer PCIe device. Rather than interpreting the MAD MMIO space as register space, PCIe read and write requests may be enqueued and may be interpreted as read and write I/O commands with addresses and lengths. If the PCIe requests are smaller than the size of media access, writes may be coalesced in a write buffer before committing to media, while reads may be buffered and potentially prefetched to maximize read bandwidth. The MAD may provide multiple options to flush write buffers, ensuring persistence and I/O ordering. For example, the flush options may include reads to specific addresses, zero-length read requests, and/or writes to specific addresses which are forwarded to the host (e.g., or back to the peer device). The direct-mapped storage may be mapped into the physical memory address space of the host, and memory coherency may not be applicable (e.g., no copies of the address space may exist in host memory or CPU caches that have coherency maintained by hardware.)

Some other systems include a NVMe controller memory buffer (CMB) which may be a memory-mapped volatile buffer which can be used to store I/O commands, completion status, and data payloads. A buffer like the CMB may be used to buffer SSD data for peer-to-peer transfer between other PCIe devices, such as RDMA NICs and GPUs, to improve I/O performance and avoid consuming host CPU and DRAM. However, software on the host CPU is needed to manage the NVMe command protocol to move data between the CMB and media. Similarly, RNICs that bridge the NVMe over fabrics protocol may also utilize the CMB as a peer-to-peer (P2P) write buffer. An interface similar to CMB may be referred to as persistent memory region (PMR), which may be included in a future version of the NVMe protocol. Like CMB, using PMR may involve the overhead of NVMe commands. Advantageously, some embodiments of a SSD with MAD may avoid the overhead of having host software or a device manage the NVMe protocol. For example, some embodiments may translate the PCIe transaction layer packet (TLP)'s operation type (e.g., read or write), data address, and data length into internal LBA-addressed I/O.

Some non-volatile dual inline memory modules (NVDIMMs) may provide non-volatile memory accessible to software via the host system's CPU, cache hierarchy, memory controller, and memory bus. Some NVDIMMs may provide PCIe devices direct access to non-volatile storage, and they may be used as targets for RDMA-based data replication. Advantageously, some embodiments of a SSD with MAD technology may reside on the PCIe bus. Accordingly, the SSD may be used for peer-to-peer I/O with other PCIe devices. Some embodiments may be particularly useful for replication. For example, because replicated data may not immediately be used by the target host's software, peer-to-peer transfer of replicated data between the RNIC and the MAD may avoid overheads in the target host's memory hierarchy. Utilizing the MAD for peer-to-peer replication may advantageously reduce utilization and increase available capacity of NVDIMMs for software running on the target host's CPU.

OS-provided memory mapping (e.g., a mmap( ) function) may implement a translation layer between virtual memory addresses and storage block addresses in system software. Advantageously, some embodiments of the MAD technology may provide translation between physical memory addresses (e.g., or bus addresses) and block addresses on the storage device itself. Demand paging may provide a page cache in system memory to coalesce byte-addressed I/O and prefetch block I/O. Advantageously, some embodiments of the MAD technology may provide a cache which resides within the storage device itself. Because demand paging and/or OS-provided memory mapping may rely on system software and system memory, they may not be suitable for peer-to-peer I/O. Advantageously, some aspects of MAD technology's functionality may be contained within the SSD to avoid the overheads of host system software and memory for peer-to-peer access to storage.

Turning now to FIG. 4, an embodiment of an electronic processing system 44 may include a CPU 45 coupled to an I/O hub 46 (e.g., an integrated I/O hub) which may include a PCIe root complex 47. Some embodiments of a SSD 48 with a MAD may enable a host system (e.g., including CPU 45 and I/O hub 46) and/or a peer PCIe device 49 to directly transfer data to or from block-addressed media (e.g., NAND or 3D) (POINT memory) without the use of a block I/O command protocol (e.g., NVMe). Peer-to-peer communication between the peer PCIe device 49 and the MAD-equipped SSD 48 may entail routing I/O through the PCIe root complex 47 (e.g., along path P), which may be part of the I/O hub 46 (e.g., which may be integrated into the CPU 45 die). The system 44 may support peer-to-peer I/O with the MAD-equipped SSD 48. Peer-to-peer I/O may not include I/O to/from the system's CPU caches, CPU registers, or main memory.

Turning now to FIG. 5, an embodiment of an electronic processing system 50 may include a CPU 51 coupled to an I/O hub 52 (e.g., an integrated I/O hub) which may include a PCIe root complex 53, with the I/O hub 52 coupled to one or more PCIe switches 54. Some embodiments of a SSD 55 with a MAD may enable a host system (e.g., including CPU 51, I/O hub 52, and switch 54) and/or a peer PCIe device 56 to directly transfer data to or from block-addressed media without the use of a block I/O command protocol. Peer-to-peer communication between the peer PCIe device 56 and the MAD-equipped SSD 55 may entail routing I/O through one or more PCIe switches 54 (e.g., along path P), and possibly through the PCIe root complex 53, which may be part of the I/O hub 52 (e.g., which may be integrated into the CPU 51 die). The system 50 may support peer-to-peer I/O with the MAD-equipped SSD 55.

Turning now to FIG. 6, an embodiment of an electronic processing system 60 may include a CPU 61 coupled to a PCI fabric 62 and a system memory 63 (e.g., DRAM). The PCI fabric 62 may be coupled to one or more PCI/PCIe devices including a NIC 64 and multiple MAD-equipped PCIe SSDs 65a, 65b, and 65c. Some embodiments of the MAD-equipped SSDs 65a, 65b, 65c may enable a host system (e.g., including CPU 61, PCI fabric 62, and memory 63) to directly transfer data to or from block-addressed media without the use of a block I/O command protocol. Multi-cast communication between the NIC 64 and the MAD-equipped SSDs 65a, 65b, 65c may entail routing I/O through the PCI fabric (e.g., along paths P, P'1, P'2, and P'3). The system 60 may support multi-cast I/O with the MAD-equipped SSDs 65a, 65b, and 65c (e.g., some embodiments may additionally support peer-to-peer I/O).

Figure 7:
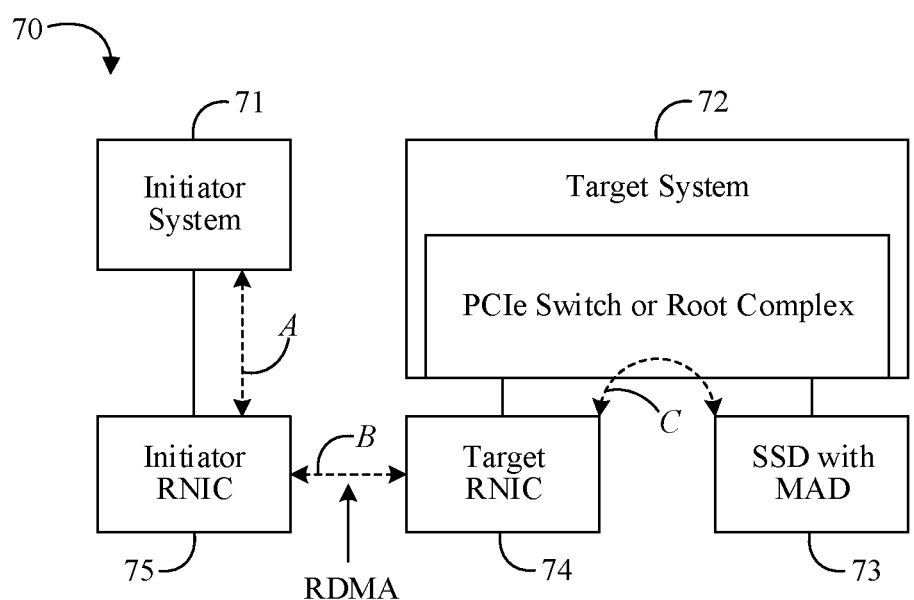
FIG. 7 is a block diagram of an example of a peer-to-peer environment according to an embodiment.

Turning now to FIG. 7, an embodiment of a peer-to-peer environment 70 may include an initiator system 71 and a target system 72. In some embodiments, a MAD-equipped SSD 73 may be a target for remote direct memory access (RDMA) requests. For example, a peer PCIe device may include a RDMA network interface controller (RNIC) 74 coupled to the target system 72. Peer-to-peer I/O may be extended to another system using the RNIC 74. Using the RDMA protocol, for example, the initiator system 71 may transfer data between an initiator RNIC 75 and the target RNIC 74 (e.g., along paths A and B), which in turn may transfer data peer-to-peer to/from block-addressed media on the MAD-equipped SSD 73 (e.g., along path C).

Memory Address to Block Address Translation Examples

Turning now to FIG. 8, an example of a PCIe memory write request TLP may include four data words (DWs) with DW 0 including length and type information, and format information, DW 1 including requester identification (ID) information, DW 2 including memory address information, and DW 3 including data. Rather than support a storage command protocol such as NVMe (Non-Volatile Memory Express), some embodiments of a MAD may directly interpret PCIe requests as I/O requests to storage. For the PCIe memory request TLP of FIG. 8, for example, the MAD may translate the address field from a memory address (e.g., DW 2) to a block address and byte offset. In some embodiments, the MAD may be configured such that a particular base memory address (e.g., as indicated by a PCI Base Address Register (BAR)) may correspond to block 0, byte offset 0. The memory address may be translated to the storage address with the block address=(memory address−memory base address)/(bytes per block), and the byte offset=(memory address−memory base address) mod (bytes per block). In some embodiments, the MAD may translate the TLP's length field (e.g., from DW 0) to the number of bytes to be transferred to/from storage following the LBA and byte offset. The MAD may also translate the TLP's opcodes for memory read and memory write operations (e.g., from DW 0) to respective requests to read or write data from/to storage.

Figure 9:
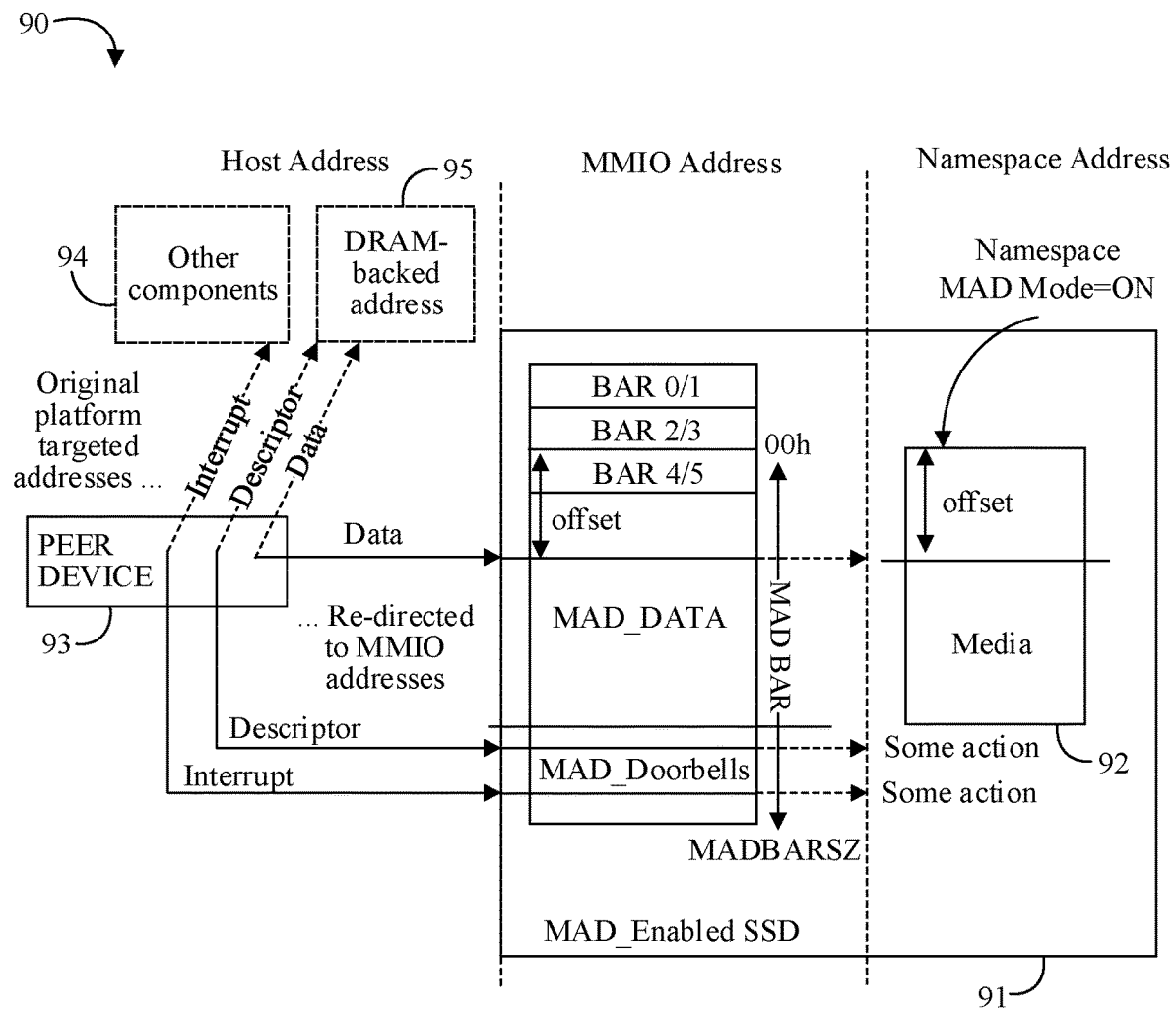
FIG. 9 is an illustrative diagram of an example of a process flow for accessing memory-mapped storage according to an embodiment.

Turning now to FIG. 9, an embodiment of a process flow 90 for accessing memory-mapped storage via a PCI memory space, which may be indicated by a PCI base address register (BAR). A host address may resolve to a MMIO address, which may be translated by a MAD enabled SSD 91 to a namespace address for the SSD media 92. The namespace address may refer to a range of LBAs and byte offsets relative to a namespace, or subset of storage (e.g. an NVMe namespace), within the SSD media 92. A peer device 93 may provide an interrupt, a descriptor, and data to MMIO addresses of the SSD 91, instead of, or in addition to, the original platform targeted host addresses of other components 94 (e.g. advanced programmable interrupt controllers (APICs)) and/or a DRAM-backed addresses 95. BAR 0/1 and BAR 2/3 may reference MMIO addresses of the MAD enabled SSD 91 other than MAD BAR (e.g., for registers associated with NVMe). BAR 4/5 may refer to MAD BAR on the MAD enabled SSD 91, which references the range of MMIO addresses containing MAD_DATA. MADBARSZ refers to the size in bytes of the MMIO address range referenced by MAD BAR. MAD_DATA refers to the range of MMIO addresses mapped to storage LBAs and byte offsets. MAD_DATA may be offset such that a strictly larger MMIO address than offset 0 of MAD BAR is translated to a namespace address of the SSD media 92. Also, MAD_DATA may be offset such that its offset 0 is translated to an address strictly larger than a namespace address offset 0 of the SSD media 92. The MMIO address range referenced by MAD BAR may contain MAD_Doorbells. The peer device 93 may read or write data to the MAD_DATA MMIO address range of the MAD enabled SSD 91. The peer device 93 may write a descriptor or an interrupt to the MAD_Doorbells MMIO address range of the MAD enabled SSD 91. The MAD enabled SSD 91 may detect a read or write to the MAD_Doorbells, and as a result, flush data previously written to MAD_DATA to the SSD media 92, and then write a second descriptor and/or second interrupt to the other components 94 and/or the DRAM-backed addresses 95. A namespace of the SSD media 92 may support a selectable MAD Mode, where if MAD Mode is "on", the namespace's data may be accessible via MAD_DATA, but if MAD Mode is "off", the namespace's data may not be accessible via MAD_DATA. The namespace's data may be accessed via a second method (e.g., NVMe commands) when MAD Mode is "off", but the namespace's data may be accessible concurrently via MAD_DATA and the second method when MAD Mode is "on".

Figure 10:
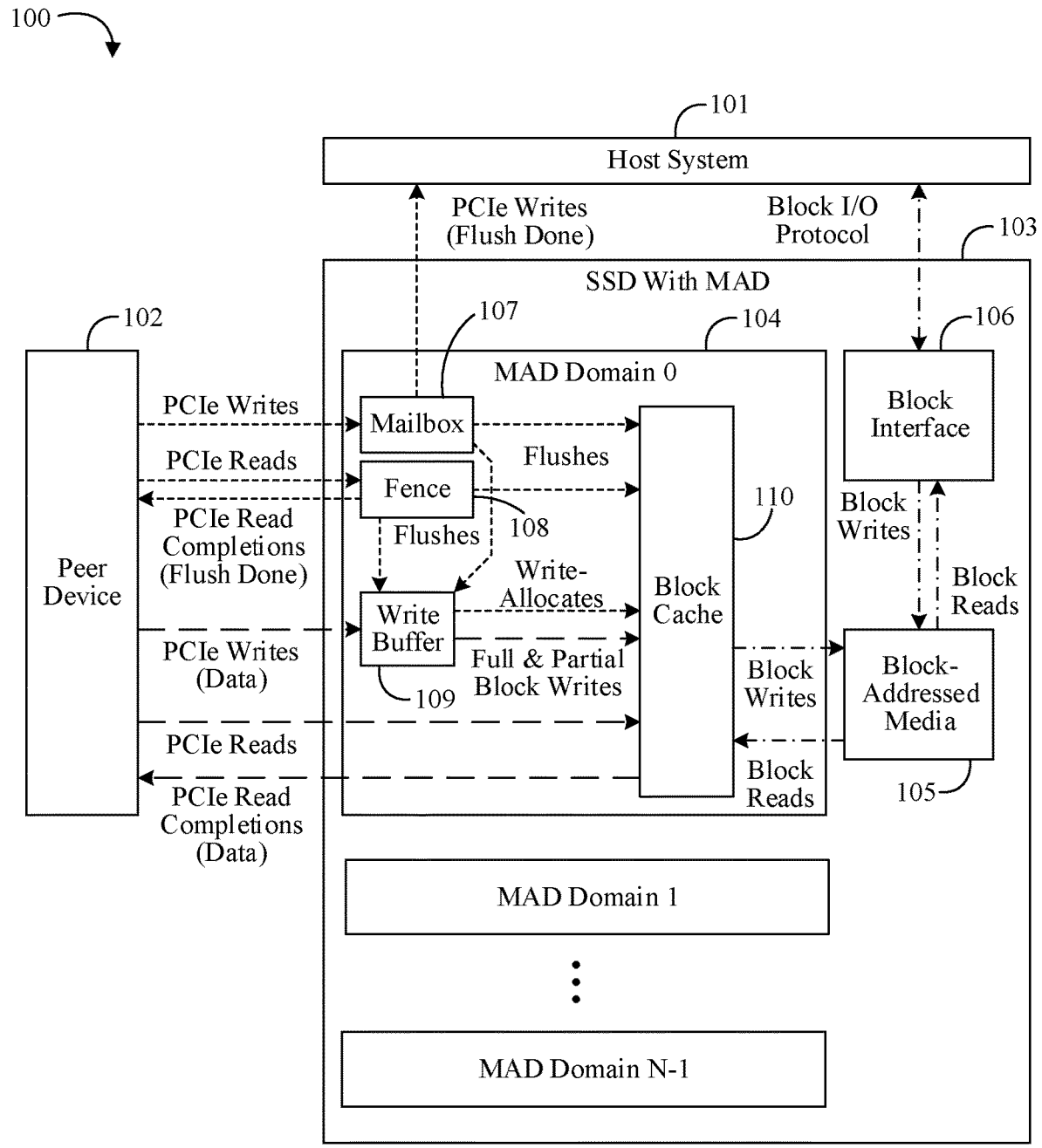
FIG. 10 is a block diagram of an example of another electronic processing system according to an embodiment.

Turning now to FIG. 10, an embodiment of an electronic processing system 100 may include a host system 101 and a peer device 102 communicatively coupled to a MAD-enabled SSD 103 (e.g., either wired or wirelessly coupled). The MAD-enabled SSD 103 may include one or more MAD domains 104 including MAD Domain 0 through MAD Domain N−1 (e.g., where N>0). The SSD 103 may include block-addressed media 105 (e.g., NAND-based NVM or 3D XPOINT memory technology), and block interface 106 communicatively coupled between the host system 101 and the block-addressed media 105. Each MAD domain 104 may include a mailbox 107, a fence 108, and a write buffer 109. The MAD domain 104 may further include a block cache 110 coupled between the block-addressed media 105 and the mailbox 107, the fence 108, and the write buffer 109.

Because PCIe memory requests may have byte granularity while access to the storage media 105 may larger block granularity, the MAD domain 104 may buffer I/O data to avoid excessive block-sized transfers to the media 105. For memory write requests, data may enter the write buffer 109 which may coalesce data from multiple writes with the same block address, but different byte offsets, into single blocks. Because there is no guarantee that the host system 101 or the peer device 102 will write to all bytes of a given block, the MAD domain 104 may eventually flush partial blocks from the write buffer 109, merge them with the block read from the media 105, and write the modified block back to the media 105 (e.g., a read-modify-write operation). This may occur, for example, following a timeout, or when the write buffer 109 becomes full due to multiple blocks being partially filled. When all bytes of a block are written to the write buffer 109, the MAD domain 104 may flush the block to the media 105 without performing the block reads and avoid the overheads of read-modify-write operation.

For memory read requests, some embodiments of the MAD domain 104 may respond with data from storage using one or more PCIe completion-with-data TLPs. The first read to a given block may cause the block to be transferred to the block cache 110 such that subsequent read requests and completion-with-data TLPs accessing the same block may be served from the cache 110. Except where there is a full block-sized memory read request, there is no guarantee that a host system 101 or peer device 102 will read from all bytes of a given block, and the MAD domain 104 may eventually evict the block from the cache 110. This may occur, for example, if the cache 110 has become full of other blocks.

When flushing partial block writes from the write buffer 107, the block cache 110 may be used to hold block reads for a read-modify-write operation (e.g., write allocate). The modified block may be written immediately (e.g., write-through semantics) or it may be held in the block cache 110 and eventually flushed (e.g., write-back semantics). With write-through semantics, if a block already exists in the block cache 110, data from write requests to the same block may bypass the write buffer 107, and instead the data may be written directly to the block cache 110, modifying the existing block.

Synchronization Examples

Because some embodiments of a MAD may provide an interface for persistent storage, operations providing synchronization may be useful to guarantee that previous writes are persistent (e.g., not lost due to unplanned power failure or device reset), and to guarantee ordering of I/O occurring before and after the synchronization operation. Some embodiments may advantageously support one or both of an end of transmission (EOT) synchronization operation and a fence synchronization operation. The EOT operation may refer to a MAD synchronization operation that may interpret a PCIe memory write request to a specific address range (e.g., a mailbox) as a request for synchronization. To acknowledge that synchronization is complete, the MAD may respond by issuing its own memory write request to a pre-configured address. The fence operation may refer to another MAD synchronization operation that may interpret a PCIe memory read request as a request for synchronization. In some embodiments, the MAD may respond with a PCIe completion-to-acknowledge indication that synchronization is complete.

For example, the EOT operation may be useful for the RDMA use case discussed previously (see FIG. 7). When synchronizing writes to target system memory, the initiator may send RDMA messages (e.g., "send" or "write with immediate") to synchronize. When the target RNIC receives a message, once it has finished transferring previous writes to target system memory, the target RNIC may then transfer a completion queue entry (CQE) indication to the target system memory, which may guarantee the completion of the writes to software on the target.

If the RNIC instead sends the data peer-to-peer to the MAD-enabled SSD, sending the CQE directly to the host may not guarantee that the MAD-enabled SSD received the data. To remedy this, in some embodiments the target RNIC may instead be configured to send CQEs peer-to-peer to the MAD (e.g., to the MAD's EOT mailbox). When synchronization is complete, the MAD may forward the CQE to the target system memory (e.g., to the address where the RNIC would normally send the CQE), which now guarantees to software that the MAD-enabled SSD has received and persisted the data.

Figure 11:
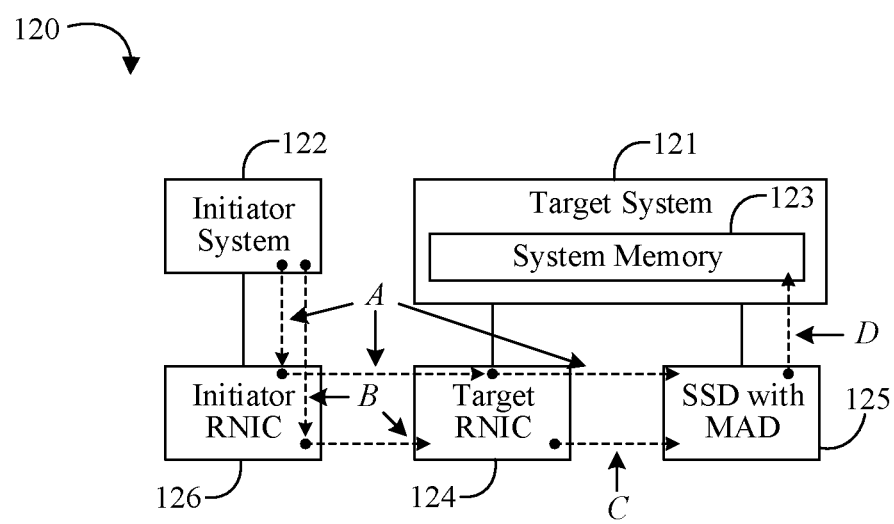
FIG. 11 is a block diagram of another example of a peer-to-peer environment according to an embodiment.

Turning now to FIG. 11, an embodiment of a peer-to-peer environment 120 may include a target system 121 and an initiator system 122. The target system 121 may include system memory 123, a target RNIC 124, and a MAD-enabled SSD 125. The initiator system 122 may include an initiator RNIC 126. Examples of synchronization of RDMA writes to the MAD-enabled SSD 125 with an embodiment of EOT technology may include writing data to the target SSD 125 (e.g., along paths A), and sending a synchronization message to the target RNIC 124 (e.g., along paths B). The target RNIC 124 may write a CQE to the MAD EOT mailbox (e.g., along path C), which may cause the MAD-enabled SSD 125 to persist all previously written data. The SSD 125 may then forward the CQE to the target system memory 123 (e.g., along path D).

Alternatively, in some embodiments the target RNIC 124 may send an interrupt message to the target system 121 after it transfers a CQE. Instead of the CQE, the interrupt message may be configured to be transferred peer-to-peer to the MAD's EOT mechanism, and the MAD may write its own interrupt message to the target system 121 to acknowledge synchronization.

In some embodiments, the MAD may implement synchronization to guarantee I/O ordering and persistence as follows: 1) receive a synchronization request (e.g., EOT or fence); 2) suspend processing of incoming I/O requests; 3) flush write buffers to the block cache or media (e.g., as described above); 4) write back all modified buffers in the block cache to media; 5) send a synchronization acknowledgement (e.g., EOT write or fence completion); and 6) resume processing incoming I/O requests.

Domain Examples

To facilitate multi-tenancy, some embodiments of a MAD may support multiple domains within an SSD. Each domain may be mapped to an independent range of memory addresses and block addresses. For RDMA, for example, each domain may support peer-to-peer I/O with different protection domains, RNICs, and/or initiator systems. Each protection domain may be used independently by different users, applications, containers, peer devices, etc.

To avoid usage of one domain from affecting performance of another, each domain may support independent write buffers and block caches. Each domain may also support synchronization operations independently of the other (e.g., by flushing write buffers and block caches only for the affected domain). Each domain may be mapped to an independent PCIe virtual channel.

Block Interface Examples

An embodiment of a SSD may allow concurrent I/O to a common range of block-addressed media via a MAD domain interface and a block I/O interface (e.g., NVMe). Each MAD domain may be mapped to a distinct namespace (e.g., or logical unit), each of which may represent an independent mapping of block addresses to media to the block I/O interface. MAD synchronization operations (e.g., fence or EOT) may be used to guarantee that writes to a MAD domain are flushed so that they are visible via the block I/O interface. Block I/O synchronization protocol commands (e.g., the NVMe flush command) may ensure that writes via the block I/O protocol are flushed so that they are visible to the MAD domain interface.

ADDITIONAL NOTES AND EXAMPLES

Example 1 may include an electronic processing system, comprising a processor, persistent storage media communicatively coupled to the processor, and logic communicatively coupled to the persistent storage media to determine one or more logical block addresses for the persistent storage media, determine one or more addresses for a physical memory space, and define a memory-mapped input/output region for the physical memory space with a direct mapping between the one or more addresses for the physical memory space and the one or more logical block addresses for the persistent storage media.

Example 2 may include the system of Example 1, wherein the logic is further to provide a pre-determined granularity for the one or more logical block addresses.

Example 3 may include the system of Example 1, wherein the logic is further to provide access to the memory-mapped input/output region based on one or more of a processor load and a processor store instruction.

Example 4 may include the system of Example 1, wherein the logic is further to provide access to the memory-mapped input/output region based on a bus access request from a peer bus device.

Example 5 may include the system of Example 4, wherein the logic is further to queue bus access requests for the memory-mapped input/output region, and interpret the bus access requests as input/output commands with associated addresses and lengths.

Example 6 may include the system of Example 5, wherein the logic is further to buffer a bus write request if the size of the bus write request is smaller than a size of a persistent storage media access.

Example 7 may include the system of Example 4, wherein the logic is further to offset the one or more logical block addresses of the persistent storage media based on an offset from a bus base address register.

Example 8 may include the system of any of Examples 1 to 7, wherein the persistent storage media comprises a non-volatile memory.

Example 9 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to determine one or more logical block addresses for a persistent storage media, determine one or more addresses for a physical memory space, and define a memory-mapped input/output region for the physical memory space with a direct mapping between the one or more addresses for the physical memory space and the one or more logical block addresses for the persistent storage media.

Example 10 may include the apparatus of Example 9, wherein the logic is further to provide a pre-determined granularity for the one or more logical block addresses.

Example 11 may include the apparatus of Example 9, wherein the logic is further to provide access to the memory-mapped input/output region based on one or more of a processor load and a processor store instruction.

Example 12 may include the apparatus of Example 9, wherein the logic is further to provide access to the memory-mapped input/output region based on a bus access request from a peer bus device.

Example 13 may include the apparatus of Example 12, wherein the logic is further to queue bus access requests for the memory-mapped input/output region, and interpret the bus access requests as input/output commands with associated addresses and lengths.

Example 14 may include the apparatus of Example 13, wherein the logic is further to buffer a bus write request if the size of the bus write request is smaller than a size of a persistent storage media access.

Example 15 may include the apparatus of Example 12, wherein the logic is further to offset the one or more logical block addresses of the persistent storage media based on an offset from a bus base address register.

Example 16 may include the apparatus of any of Examples 9 to 15, wherein the persistent storage media comprises a non-volatile memory.

Example 17 may include the apparatus of any of Examples 9 to 15, wherein the logic coupled to the one or more substrates includes transistor channel regions that are positioned within the one or more substrates.

Example 18 may include a method of mapping memory, comprising determining one or more logical block addresses for a persistent storage media, determining one or more addresses for a physical memory space, and defining a memory-mapped input/output region for the physical memory space with a direct mapping between the one or more addresses for the physical memory space and the one or more logical block addresses for the persistent storage media.

Example 19 may include the method of Example 18, further comprising providing a pre-determined granularity for the one or more logical block addresses.

Example 20 may include the method of Example 18, further comprising providing access to the memory-mapped input/output region based on one or more of a processor load and a processor store instruction.

Example 21 may include the method of Example 18, further comprising providing access to the memory-mapped input/output region based on a bus access request from a peer bus device.

Example 22 may include the method of Example 21, further comprising queuing bus access requests for the memory-mapped input/output region, and interpreting the bus access requests as input/output commands with associated addresses and lengths.

Example 23 may include the method of Example 22, further comprising buffering a bus write request if the size of the bus write request is smaller than a size of a persistent storage media access.

Example 24 may include the method of Example 21, further comprising offsetting the one or more logical block addresses of the persistent storage media based on an offset from a bus base address register.

Example 25 may include the method of any of Examples 18 to 24, wherein the persistent storage media comprises a non-volatile memory.

Example 26 may include at least one computer readable medium, comprising a set of instructions, which when executed by a computing device, cause the computing device to determine one or more logical block addresses for a persistent storage media, determine one or more addresses for a physical memory space, and define a memory-mapped input/output region for the physical memory space with a direct mapping between the one or more addresses for the physical memory space and the one or more logical block addresses for the persistent storage media.

Example 27 may include the at least one computer readable medium of Example 26, comprising a further set of instructions, which when executed by the computing device, cause the computing device to provide a pre-determined granularity for the one or more logical block addresses.

Example 28 may include the at least one computer readable medium of Example 26, comprising a further set of instructions, which when executed by the computing device, cause the computing device to provide access to the memory-mapped input/output region based on one or more of a processor load and a processor store instruction.

Example 29 may include the at least one computer readable medium of Example 26, comprising a further set of instructions, which when executed by the computing device, cause the computing device to provide access to the memory-mapped input/output region based on a bus access request from a peer bus device.

Example 30 may include the at least one computer readable medium of Example 29, comprising a further set of instructions, which when executed by the computing device, cause the computing device to queue bus access requests for the memory-mapped input/output region, and interpret the bus access requests as input/output commands with associated addresses and lengths.

Example 31 may include the at least one computer readable medium of Example 30, comprising a further set of instructions, which when executed by the computing device, cause the computing device to buffer a bus write request if the size of the bus write request is smaller than a size of a persistent storage media access.

Example 32 may include the at least one computer readable medium of Example 29, comprising a further set of instructions, which when executed by the computing device, cause the computing device to offset the one or more logical block addresses of the persistent storage media based on an offset from a bus base address register.

Example 33 may include the at least one computer readable medium of any of Examples 26 to 32, wherein the persistent storage media comprises a non-volatile memory.

Example 34 may include a memory mapped input/output apparatus, comprising means for determining one or more logical block addresses for a persistent storage media, means for determining one or more addresses for a physical memory space, and means for defining a memory-mapped input/output region for the physical memory space with a direct mapping between the one or more addresses for the physical memory space and the one or more logical block addresses for the persistent storage media.

Example 35 may include the apparatus of Example 34, further comprising means for providing a pre-determined granularity for the one or more logical block addresses.

Example 36 may include the apparatus of Example 34, further comprising means for providing access to the memory-mapped input/output region based on one or more of a processor load and a processor store instruction.

Example 37 may include the apparatus of Example 34, further comprising means for providing access to the memory-mapped input/output region based on a bus access request from a peer bus device.

Example 38 may include the apparatus of Example 37, further comprising means for queuing bus access requests for the memory-mapped input/output region, and means for interpreting the bus access requests as input/output commands with associated addresses and lengths.

Example 39 may include the apparatus of Example 38, further comprising means for buffering a bus write request if the size of the bus write request is smaller than a size of a persistent storage media access.

Example 40 may include the apparatus of Example 37, further comprising means for offsetting the one or more logical block addresses of the persistent storage media based on an offset from a bus base address register.

Example 41 may include the apparatus of any of Examples 34 to 40, wherein the persistent storage media comprises a non-volatile memory.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
persistent storage media communicatively coupled to the processor; and
logic communicatively coupled to the persistent storage media to:
   determine one or more logical block addresses for the persistent storage media,
   determine one or more addresses for a physical memory space, and
   define a memory-mapped input/output region for the physical memory space with a direct mapping between the one or more addresses for the physical memory space and the one or more logical block addresses for the persistent storage media, wherein the persistent storage media comprises a solid-state drive with memory-addressed device technology to map memory space to non-volatile storage, and wherein peer-to-peer writes of data between a peer device to the memory-addressed device technology of a host system do not interfere with a central processing unit of the host system.

2. The system of claim 1, wherein the logic is further to:
provide a pre-determined granularity for the one or more logical block addresses.

3. The system of claim 1, wherein the logic is further to:
provide access to the memory-mapped input/output region based on one or more of a processor load and a processor store instruction.

4. The system of claim 1, wherein the logic is further to:
provide access to the memory-mapped input/output region based on a bus access request from a peer bus device.

5. The system of claim 4, wherein the logic is further to:
queue bus access requests for the memory-mapped input/output region; and
interpret the bus access requests as input/output commands with associated addresses and lengths.

6. The system of claim 5, wherein the logic is further to:
buffer a bus write request if the size of the bus write request is smaller than a size of a persistent storage media access.

7. The system of claim 4, wherein the logic is further to:
offset the one or more logical block addresses of the persistent storage media based on an offset from a bus base address register.

8. The system of claim 1, wherein the persistent storage media comprises a non-volatile memory.

9. A semiconductor apparatus, comprising:
one or more substrates; and
logic coupled to the one or more substrates, wherein the logic is at least partly implemented in one or more of configurable logic and fixed-functionality hardware logic, the logic coupled to the one or more substrates to:
determine one or more logical block addresses for a persistent storage media,
determine one or more addresses for a physical memory space, and
define a memory-mapped input/output region for the physical memory space with a direct mapping between the one or more addresses for the physical memory space and the one or more logical block addresses for the persistent storage media, wherein the persistent storage media comprises a solid-state drive with memory-addressed device technology to map memory space to non-volatile storage, and wherein peer-to-peer writes of data between a peer device to the memory-addressed device technology of a host system do not interfere with a central processing unit of the host system.

10. The apparatus of claim 9, wherein the logic is further to:
provide a pre-determined granularity for the one or more logical block addresses.

11. The apparatus of claim 9, wherein the logic is further to:
provide access to the memory-mapped input/output region based on one or more of a processor load and a processor store instruction.

12. The apparatus of claim 9, wherein the logic is further to:
provide access to the memory-mapped input/output region based on a bus access request from a peer bus device.

13. The apparatus of claim 12, wherein the logic is further to:
queue bus access requests for the memory-mapped input/output region; and
interpret the bus access requests as input/output commands with associated addresses and lengths.

14. The apparatus of claim 13, wherein the logic is further to:
buffer a bus write request if the size of the bus write request is smaller than a size of a persistent storage media access.

15. The apparatus of claim 12, wherein the logic is further to:
offset the one or more logical block addresses of the persistent storage media based on an offset from a bus base address register.

16. The apparatus of claim 9, wherein the persistent storage media comprises a non-volatile memory.

17. The apparatus of claim 9, wherein the logic coupled to the one or more substrates includes transistor channel regions that are positioned within the one or more substrates.

18. A method of mapping memory, comprising:
determining one or more logical block addresses for a persistent storage media;
determining one or more addresses for a physical memory space; and
defining a memory-mapped input/output region for the physical memory space with a direct mapping between the one or more addresses for the physical memory space and the one or more logical block addresses for the persistent storage media, wherein the persistent storage media comprises a solid-state drive with memory-addressed device technology to map memory space to non-volatile storage, and wherein peer-to-peer writes of data between a peer device to the memory-addressed device technology of a host system do not interfere with a central processing unit of the host system.

19. The method of claim 18, further comprising:
providing a pre-determined granularity for the one or more logical block addresses.

20. The method of claim 18, further comprising:
providing access to the memory-mapped input/output region based on one or more of a processor load and a processor store instruction.

21. The method of claim 18, further comprising:
providing access to the memory-mapped input/output region based on a bus access request from a peer bus device.

22. The method of claim 21, further comprising:
queuing bus access requests for the memory-mapped input/output region; and
interpreting the bus access requests as input/output commands with associated addresses and lengths.

23. The method of claim 22, further comprising:
buffering a bus write request if the size of the bus write request is smaller than a size of a persistent storage media access.

24. The method of claim 21, further comprising:
offsetting the one or more logical block addresses of the persistent storage media based on an offset from a bus base address register.

25. The method of claim 18, wherein the persistent storage media comprises a non-volatile memory.

* * * * *